United States Patent [19]
Aboaf et al.

[11] Patent Number: 6,038,106
[45] Date of Patent: *Mar. 14, 2000

[54] PIGGYBACK MAGNETO-RESISTIVE READ/WRITE TAPE HEAD WITH OPTIMIZED PROCESS FOR SAME GAP READ/WRITE

[75] Inventors: Joseph Adam Aboaf; Edward Virgil Denison; Jules David Friedman; Vincent Noel Kahwaty; Herman Carl Kluge, II, all of Tucson, Ariz.

[73] Assignee: International Business Machines Corporation, Armonk, N.Y.

[*] Notice: This patent is subject to a terminal disclaimer.

[21] Appl. No.: 08/438,317

[22] Filed: May 10, 1995

[51] Int. Cl.⁷ .............................. G11B 5/39; G11B 5/17
[52] U.S. Cl. .............................................................. 360/113
[58] Field of Search .................................... 360/113, 121, 360/125–126

[56] References Cited

U.S. PATENT DOCUMENTS

| | | | |
|---|---|---|---|
| 4,321,641 | 3/1982 | Lee | 360/103 |
| 4,546,398 | 10/1985 | Toda et al. | 360/126 |
| 5,218,497 | 6/1993 | Tanabe et al. | 360/113 |
| 5,264,981 | 11/1993 | Campbell et al. | 360/126 |
| 5,287,237 | 2/1994 | Kitada et al. | 360/113 |
| 5,309,305 | 5/1994 | Nepela et al. | 360/113 |
| 5,331,493 | 7/1994 | Schwarz | 360/113 |
| 5,465,186 | 11/1995 | Bajorek et al. | 360/113 |
| 5,515,221 | 5/1996 | Gill et al. | 360/113 |
| 5,530,608 | 6/1996 | Aboaf et al. | 360/113 |

FOREIGN PATENT DOCUMENTS

| | | |
|---|---|---|
| 0 152 000 | 8/1985 | European Pat. Off. . |
| 0 372 420 | 6/1990 | European Pat. Off. . |
| 521442 | 1/1993 | European Pat. Off. . |
| 0 631 275 A2 | 12/1994 | European Pat. Off. . |
| 0 651 375 A1 | 5/1995 | European Pat. Off. . |
| 61-77114 | 4/1986 | Japan . |
| 61-96508 | 5/1986 | Japan . |
| 2-94014 | 4/1990 | Japan . |

*Primary Examiner*—George J. Letscher
*Attorney, Agent, or Firm*—Benman & Collins

[57] ABSTRACT

A magneto-resistive read/write tape head is provided for reading and writing to tape media along a tape head face. The tape head comprises a plurality of modules, each module comprising a read element and a write element spaced apart and terminating at the tape head face and formed over a substrate. The read element comprises a soft film bias layer and a hard film bias layer butted against the SFB layer. The write element comprises two pole tips spaced apart by a gap. The tape head further includes a plurality of activating conducting coil turns operatively associated with the write element and covered by a cross-linked photoresist and positioned between the gap and one of the pole tips and set back from the tape head face. The tape head has at least one of the following elements: (a) a wear shield between the read element and the write element for limiting wear of the gap between the two pole tips, the wear shield being grounded for decoupling read and write functions of the tape head, for allowing same module read/servo/write functions simultaneously, and for grounding static charge from the tape media; (b) a layer of electrically conductive and corrosion-resistant material, such as rhodium, under the hard film bias layer to reduce its resistance; and (c) a non-activating dummy coil turn closer to the pole tips than the activating coil turns for defining a forward termination of the cross-linked photoresist between the activating coil turns and the tape head face to thereby provide improved ease of processability.

21 Claims, 3 Drawing Sheets

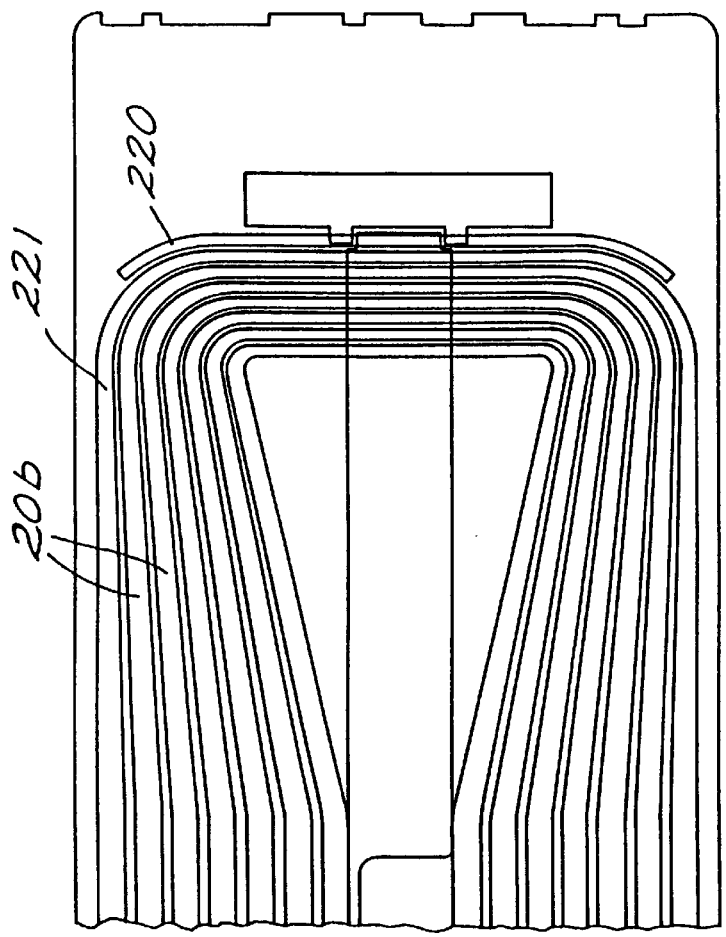
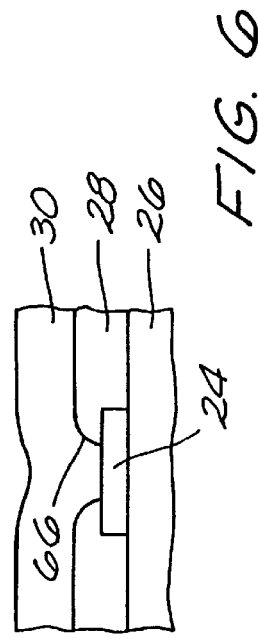
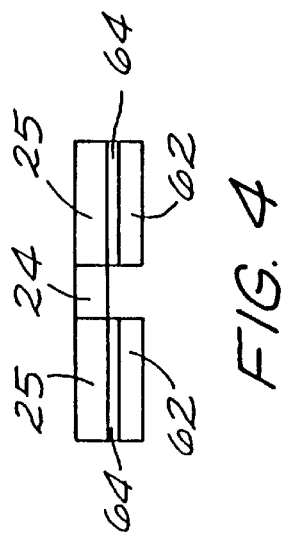

PIGGYBACK MAGNETO-RESISTIVE READ/WRITE TAPE HEAD WITH OPTIMIZED PROCESS FOR SAME GAP READ/WRITE

CROSS-REFERENCE TO RELATED APPLICATION

The present application is related to co-pending application Ser. No. 08/438,319, filed on even date herewith, entitled "An Asymmetric Recording Head for Same Gap Servo Optimization" [TU-994-050]. That application is directed to a head design offering "same-gap" servo, thereby reducing track misregistration (TMR) tolerances.

TECHNICAL FIELD

The present invention relates generally to magnetic recording, and, more particularly, to a thin film magneto-resistive (MR) head having same module read/write/servo functions.

BACKGROUND ART

Business, science, and entertainment applications depend upon computers to process and record data, often with large volumes of data being stored or transferred to non-volatile storage media. The non-volatile storage media typically include magnetic discs, magnetic tape cartridges, optical disk cartridges, floppy diskettes, or floptical diskettes. The advantages of storing data on non-volatile storage media are numerous, including: a capability of storing hundreds of megabytes or even gigabytes of data (additional cartridges can be used to store still more data); providing a vehicle for long term storage and archival; backing up that data which resides on non-removable media; and providing a convenient vehicle for transferring data between computers. Typically, magnetic tape media is the most economical means of storing or archiving data.

The amounts of data stored, accessed and processed by computers has increased as the computing power of the internal processors has increased. Hence, storage technology is continually pushed to increase storage capacities (as well as storage reliability). Improvements in storage densities in magnetic storage media, for example, have come in many areas, including improved media materials, improved error correction techniques, and decreased bit sizes. The amount of data stored on half-inch magnetic tape, for example, has increased from megabytes of data stored on nine data tracks to gigabytes (Gbytes) of data stored on 128 tracks of data.

The improvement in data densities on magnetic storage media is due in large part to improvements made in the transducer used for reading and writing data to the magnetic storage medium. A major improvement in transducer technology has been realized with the magneto-resistive (MR) transducer developed by the IBM Corporation. The MR transducer detects magnetic field signals as resistance changes in an MR stripe. Data densities can be increased using an MR transducer because signal levels for the MR transducer are typically much higher than for conventional inductive read heads. Furthermore, the output of the MR transducer depends only on the instantaneous magnetic field from the media and is independent of media velocity or time rate of change of the sensed fields.

In a three-gap magnetic recording head, two read heads are separated by a write head; the entire distance is on the order of 1,500 to 5,000 $\mu$m, and can result in misalignments approaching 15 to 20 $\mu$m. In a two-gap magnetic recording head, a single read head and a single write head are provided side-by-side, resulting in possible misalignments on the order of only a few micrometers. Consequently, the two-gap magnetic recording head can provide significant advantages over a three-gap head.

A two-gap version of a 13 Gbyte head would be a cost reduction and performance improvement over the present three-gap head. Due to track misregistration (TMR) considerations, only a multi-channel-stepper head will give adequate performance for the two-gap version. A key requirement of this type of head is the ability to servo in the same gap line which is writing with the center of read elements separated from the center of write elements by only 408 $\mu$m. However, current tape head designs do not provide for same gap read/write function requiring the read-while-write sensor to be positioned on an opposing module. The cost of mechanically aligning the opposing modules to the required tolerances has become a major cost concern, and in the case of unidirectional application forces the fabrication of the opposing module at a double film cost.

Existing designs do not address common high coercivity media (900 to 1,800 Oe) concerns such as wide mechanical gap wear (>20 $\mu$m), static charge removal or the extraneous write field seen from the top edge of the P2 pole piece.

Designs for maintaining high (>45°) insulator resist apex angles do not address manufacturability when the P2 pole cannot be plated and all patterning must be accomplished via ion milling.

High resistance read elements suffer from heat effects causing degraded signal-to-noise ratio (SNR) and reliability performance.

Piggyback read and write element structures have been used in DASD (direct access storage devices; i.e., hard disk) magneto-resistive heads. However, they have not been used in a read-after-write application such as described herein for magnetic tape application. Therefore, the alignment benefit has not been addressed for the DASD heads.

There are no other solutions to the problems addressed by the present invention.

DISCLOSURE OF INVENTION

In accordance with the present invention, a magneto-resistive read/write tape head is provided for reading and writing to tape media along a tape head face. The tape head comprises a plurality of modules, each module comprising a read element and a write element spaced apart and terminating at the tape head face and formed over a substrate. The read element comprises a soft film bias (SFB) layer and a hard film bias (HFB) layer that butts against the SFB on each side. The write element comprises two pole tips spaced apart by a gap. The tape head further includes a plurality of activating conducting coil turns operatively associated with the write element and covered by a cross-linked photoresist and positioned between the gap and one of the pole tips and set back from the tape head face. The tape head of the present invention has at least one of the following elements:

(a) a wear shield between the read element and the write element for limiting wear of the gap between the two pole tips, the wear shield being grounded for decoupling read and write functions of the tape head, for allowing same module read/servo/write functions simultaneously, and for grounding static charge from the tape media;

(b) a layer of high conductivity, low wear, high corrosion-resistant material, such as rhodium, under the HFB to reduce its resistance;

(c) a non-activating dummy coil turn closer to the pole tips than the activating coil turns for defining a forward termination of the cross-linked photoresist between the activating coil turns and the tape head face to thereby provide improved ease of processability.

The tape head of the present invention advantageously:

(1) Provides improved alignment of read and write elements for the same data track. This in turn allows for greater flexibility in allocating track misregistration budget and can lead to increased track density on tape.

(2) The piggyback read and write elements places the read verify element in closer proximity to the write element (micrometers vs millimeters), which will result in quicker read verification and error detection and correction.

(3) A reduction of read element resistance provides greater flexibility in element lead design and reduces read bias current heating in the head. It also reduces corrosion because it is at the air-bearing surface on the finished head.

(4) The wear shield layer greatly reduces the gap erosion problem and therefore improves head life.

(5) The grounding of the S2 shield and the wear shield layer help reduce the propensity for electro-static voltage spikes into the read elements due to high resistivity magnetic recording tape. The S2 is grounded through a resistance of about 1 KΩ.

(6) The dummy coil turn addresses the requirement for tight process control and yield losses at the write element pole definition process step.

(7) The write performance degradation due to the high $4\pi M_s$ saturation magnetization material used in the P2 shield is addressed by the addition of a lower $4\pi M_s$ material as part of the P2 layer.

The advantages of the present invention over existing solutions include:

(1) The piggyback read and write element design is a significant alignment improvement since previous art in tape magnetic recording heads rely on a mechanical alignment of two separate modules (physical pieces) that contain the write element in one and the corresponding read element in the other. Mechanical alignment cannot achieve as precise tolerance as a photolithography process. Better alignment of the read and write elements allows for greater flexibility in allocating track misregistration budget and can lead to increased track density on tape.

(2) The piggyback design greatly reduces the spacing of the write element and the corresponding read verify element. The advantage is that the verify time is therefore reduced and this reduces buffer size, error detection time, and correction time.

(3) The conductive underlayer under the HFB (CoPtCr) butting the magneto-resistive layer reduces the read element resistance which therefore will result in both a lower bias voltage drop and I²R heating of the head. This reduces the potential for tape stick and tape damage. This also allows the head designer greater flexibility in laying out the read element leads as the length of the leads would be less of an impact on read circuit resistance.

(4) The wear shield layer has a significant mechanical hardness improvement over alternate insulation layer materials which results in less gap erosion. This would greatly increase the expected life of the head.

(5) The grounding of the wear shield layer and the S2 through a resistance helps solve the electro-static voltage discharge problem by providing a solution in the head structure itself. This then gives the head greater latitude in compatible magnetic recording tape. That is, there would not have to be a requirement for low resistivity magnetic recording tape to be used.

(6) The dummy coil turn of the write element significantly improves the process window for the ion beam mill write pole definition process. Product yield is improved and tight process control of this operation is reduced.

(7) The addition of the low $4\pi M_s$ material as part of the write P2 layer is the most effective way to address the extraneous writing problem. If the pole were fabricated entirely from a low $4\pi M_s$ material, it would have to be significantly thicker. This would require a longer deposition and therefore increase the manufacturing time and cost of the head.

BRIEF DESCRIPTION OF THE DRAWINGS

FIG. 3 is a top plan view of a portion of the tape head shown in FIG. 1, depicting the conductive coil turns;

FIG. 4 is a cross-sectional view of the soft film bias and hard film bias read element;

FIG. 5 is a top plan view grounding a shield resistor to one leg of a read element to reduce static electricity from the tape media; and FIG. 6 is a cross-sectional view, taken along the line 6—6 of FIG. 5.

BEST MODES FOR CARRYING OUT THE INVENTION

A. Construction of Read/Write Head

Figure 1:
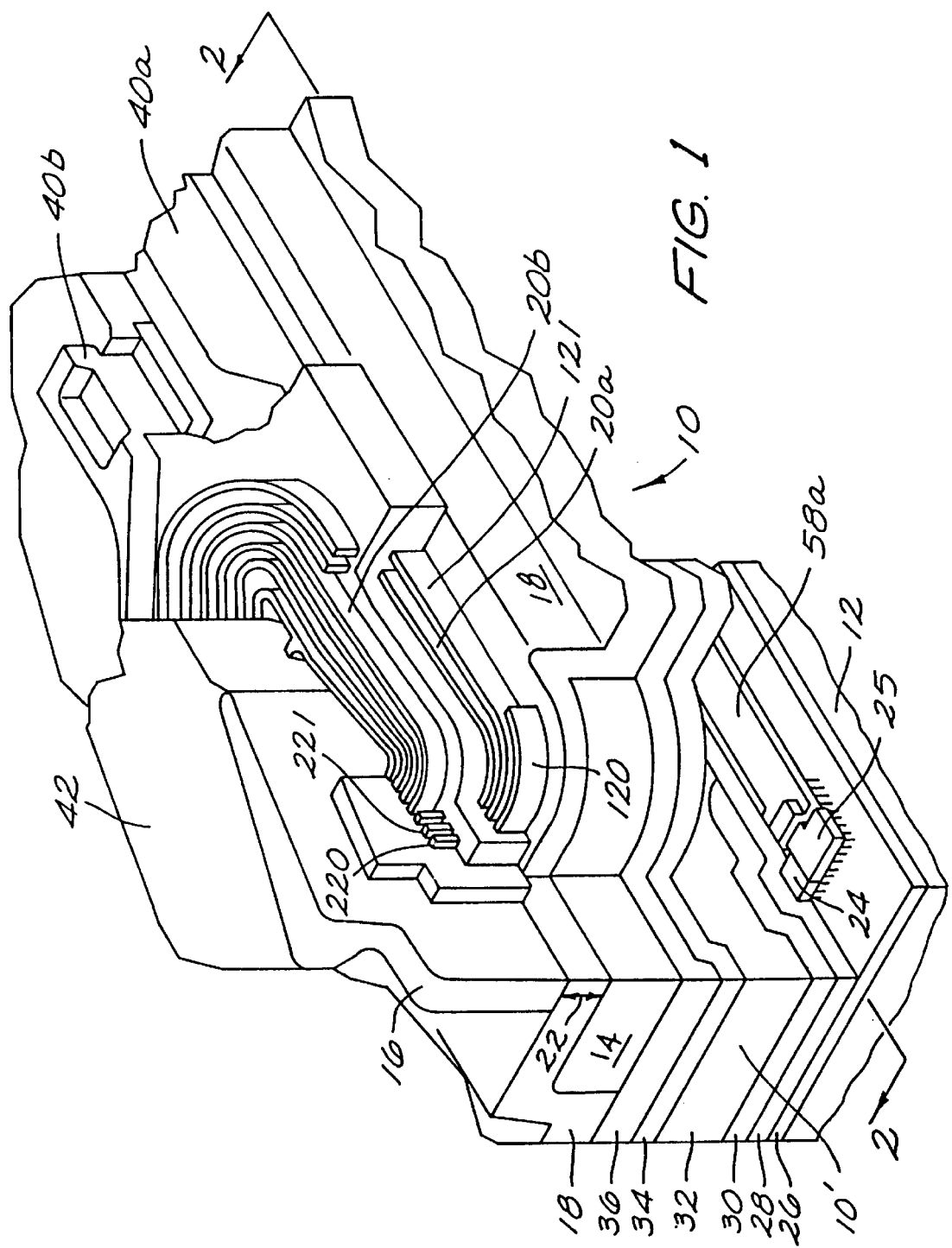
FIG. 1 is a perspective view, partly in section, of the piggy-back write/read tape head of the present invention.
Figure 2:
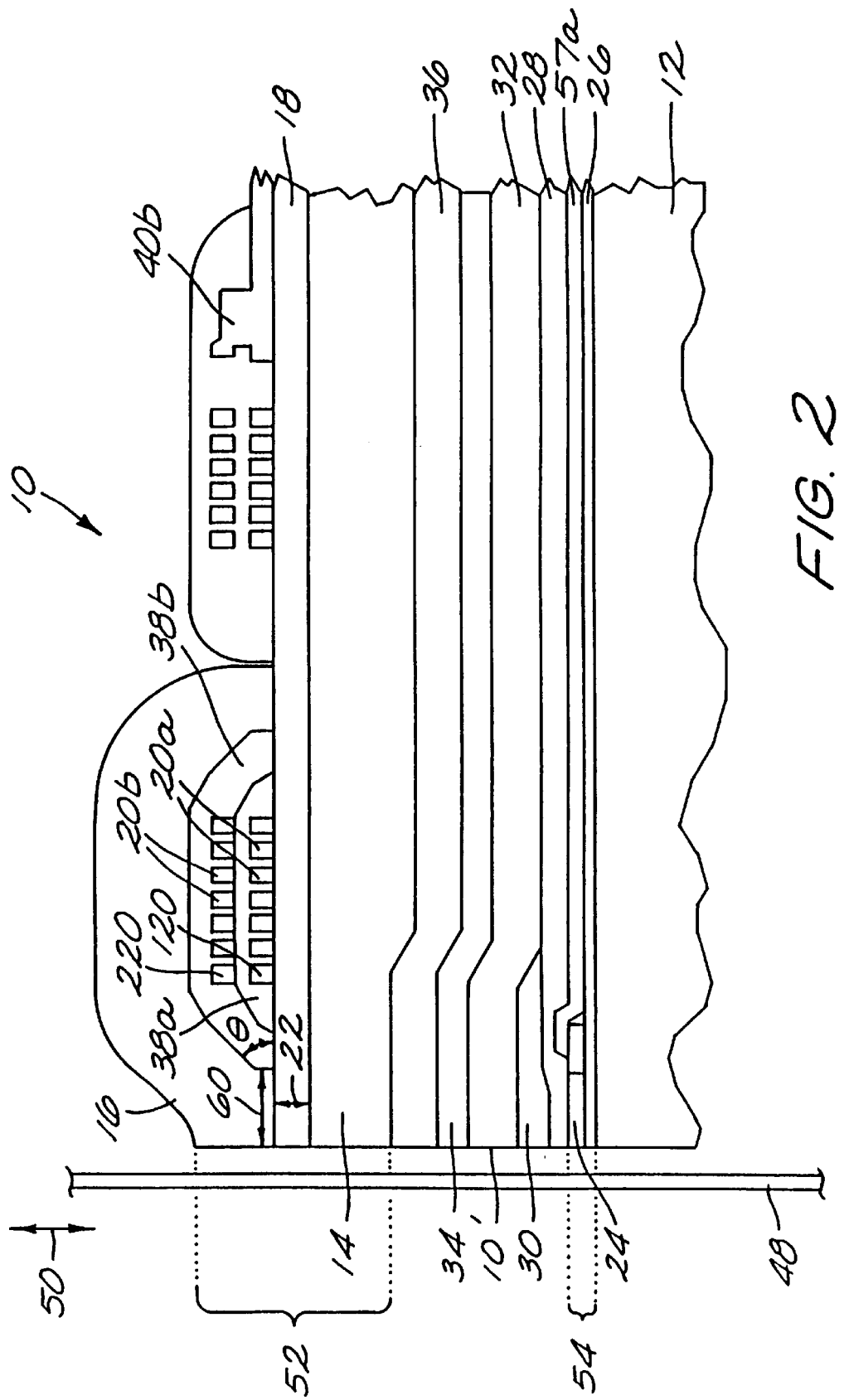
FIG. 2 is a cross-sectional view, taken along the line 2—2 of FIG. 1.

Referring now to the drawings, wherein like reference numerals depict like elements throughout, FIG. 1 shows a cross-section of the piggy-back write read construction of the thin film magnetic head 10 of the present invention and the various shields employed for use in contact recording on flexible magnetic media, such as magnetic tape (not shown in FIG. 1, but visible in FIG. 2). The magnetic head 10 includes a magnetic substrate 12, generally made of a magnetic ceramic, such as nickel zinc ferrite. A non-magnetic substrate can also be used. This could be an $Al_2O_3$—TiC substrate covered by a magnetic shield similar to the shield described below (layer 30), having a thickness of about 1 to 2 μm, and an insulator material. This composite is equivalent to the magnetic substrate 12. A first thin film pole write piece 14, denoted P1, generally made of a Permalloy (e.g., nickel-iron), or multilayer Permalloy/iron laminate and/or amorphous nitrided magnetic materials, is deposited over the substrate 12. A second thin film write pole piece 16, denoted P2, of the same magnetic material is deposited onto an insulating layer 18 which supports coil conductors 20 and forms a magnetic gap 22.

The first pole piece P1 14 is formed over a plurality of layers, starting with a soft film bias (SFB) material 24 sandwiched between two insulating layers 26 and 28, with insulating layer 26 formed on the substrate 12. The SFB material 24 provides the read function of the read/write head 10 and comprises a layer of NiFeRh of about 270 Å, a layer of tantalum of about 200 Å, and a layer of NiFe of about 350 Å (the magnetic layers NiFeRh and NiFe are of such composition that the magnetostriction of the films is close to zero). On each side of the SFB material 24, a layer 25 of permanent magnetic material (CoPtCr, 1000 Å) is deposited to pin the domain at the edge of the MR element 24; this layer is referred to as the hard film bias (HFB) layer. The two insulating layers 26, 28 may comprise any of the common insulating materials; since alumina ($Al_2O_3$) is used elsewhere in the fabrication of the magnetic head 10, it is advantageously employed here as well. To center the MR (NiFe) in Lhe gap magnetically, the thickness of the insulating layer 26 is about 2,000 Å, while the thickness of the insulating layer 28 is about 2,200 Å.

A first shield layer 30 is next formed on the top insulating layer 28. The first shield layer 30 comprises a wear-resistant magnetic layer of about 1 to 2 μm thick. This layer is composed of laminated Fe and NiFe films (Fe, 300 to 1,800 Å thick; NiFe, 50 to 300 Å thick) deposited in a nitrogen-containing atmosphere (up to about 20% nitrogen content). The first shield layer 30 is a magnetic shield arid its spacing, set by insulating layer 28, determines the frequency response of the device in combination with spacing layer 26. The thinner the layers (26, 28), the higher the frequency response. Typically, a thickness of about 1 μm is employed for this layer 30.

An insulating layer 32 is formed on the first shield layer 30, and, for the reasons discussed above, advantageously comprises alumina. It is formed to a thickness in the range of 1 to 10 μm, and typically about 2 μm.

A second shield layer 34 is formed on the insulating layer 32 and acts as a wear shield, to minimize erosion of the air-bearing surface 10' of the magnetic head 10. The second shield layer 34 comprises a hard material (having the best wear properties), such as a NiFe—N/Fe—N laminate, and is formed to a thickness of 1 to 3 μm. (As used herein, NiFe—N and Fe—N refer to the nitrides of nickel-iron alloys and iron, respectively.) Typically, a thickness of about 1 μm is employed for this layer 34. Any nitrided magnetic material could be used, but the above laminate has the best wear properties found to date.

Another insulating layer 36 is formed on the second shield layer 34, and advantageously comprises the same material (e.g., alumina) having essentially the same thickness (e.g., about 1 μm). The first write pole piece layer P1 14 is formed on this insulating layer 36.

The first write pole piece layer P1 14 comprises a magnetic material, such as a nickel-iron alloy or multilayer NiFe/Fe laminate, or any high saturation magnetization $4\pi M_s$ nitrided material, and is formed to a thickness of about 2 to 6 μm. Typically, this P1 layer 14 is about 3.5 μm thick.

The second write pole piece layer P2 16 also comprises a magnetic material, advantageously the same material and thickness as the first write pole piece layer P1 14. Both P1 14 and P2 16 have the same composition.

The insulating gap layer 18 is formed on the P1 layer 14 and separates P1 from P2 16. The insulating layer 18 preferably comprises alumina and establishes gap 22 between P1 14 and P2 16. The thickness of the gap 22 controls the magnetic field between P1 14 and P2 16 created by current in the write coils 20. In the present embodiment, the gap 22 is 2.3 μm.

Two rows of activating conductor coil turns 20 are formed over the insulating gap layer 18, a first, or lower, row 20a formed on the insulating gap layer and a second, or upper, row 20b formed above the first row. Electrically insulating material 38 separates the two rows of coil turns 20a, 20b and also provides support for the P2 layer 16 above the coil turns. The conductor turns 20 can be made of an electrically conducting material, such as copper or gold. The electrically insulating material 38 advantageously comprises a hardened photoresist. The conductor turns 20a and 20b terminate in conductive terminations 40a and 40b, respectively, to which electrical contact is made.

A leveling layer 42 of alumina and/or an epoxy material, for example, is then formed over the P2 16. The leveling layer 42 is thick enough to be lapped flat and still be a certain distance (1 to 2 μm) above the top part of the P2 layer 16. Lapping the leveling layer 42 flat provides a flat surface for bonding of a non-magnetic ceramic closure (not shown) to produce the completed read/write transducing element.

The magnetic tape media 48 moves in a direction as shown by arrow 50 operating in a motion transverse to the pole pieces 14 and 16 over the face, or air-bearing surface, 10' where the contact recording takes place.

FIG. 2 shows a more detailed cross-section of one head element and the shielding between the read and write elements on the same track line. Between the read and write elements are two layers 32, 36 of insulator material, e.g., alumina, each about 2 μm thick, and a wear/isolation shield 34, about 1 μm thick, which extends over the region where the read and write elements overlap. The wear shield 34 provides a dual function: (1) it provides magnetic isolation between the read and write portions of the head element and (2) because it comprises a hard material, it prevents wear of the alumina in the head tape contact area. In one preferred embodiment, the wear shield comprises a NiFe—N/Fe—N laminate, but other pole-tip materials could also be used. It is possible to ground this wear isolation shield to further reduce capacitative coupling between readers and writers.

Advantages of Read/Write Head

To allow same module read/write/servo function, write element 52, comprising P1 14 and P2 16, is constructed immediately above the read element 54, comprising SFB layer 24, to allow alignment via lithographic means. The write and read elements 52, 54 are separated by a minimum of 5 μm of spacing films to minimize write element effects on the read element. The alignment of the write element 52 above the read element 54 on the same track on the same substrate 12 allows read verification of written data from the same recording head module and therefore there is more precise alignment of the read and write elements. The prior art approaches had the read elements for a write verify in a second head module that had to be mechanically aligned (which inherently has greater tolerance variation than a thin-film photolithography process).

To limit static discharge from high resistivity tape 48 through the read element 54, the S2 shield 30 is resistively grounded employing a resistor 56 comprising MR material and connected to read leg 58b (FIGS. 1, 4, and 5).

To minimize the wear of the spacing films ($AI_2OZ_3$) 32, 36, the wear shield 34 is about 1 pm thick and is composed of the same material as the read shield S2 30. The wear shield 34 is placed midway between the elements 52, 54. Without significant spacing, film wear erosion of the read/write shields is also minimized. To reduce read/write coupling, the wear shield 34 is also grounded in an area adjacent the contact pads. The wear shield 34 is grounded directly, while the read shield S2 30 is grounded through resistance 56. The use of wear shield layer 34 as part of the insulation between the write and read element structure helps minimize the problem of gap erosion and helps prolong the life of the head. The grounding of both the wear shield layer 34 and the read shield layer 30 through the resistance 56 alleviates the problem of static discharge from high resistivity magnetic recording tape 48.

Since the wear shield 34 is electrically conductive, it lends itself to further use as a tape static and write flux ground, allowing elimination of voltage spikes known to cause read instability and to enhance read/write element isolation.

The write element 52 is constructed above and in line with the read element 54 and is aligned lithographically. The write element 52 incorporates several unique features in its construction. It is desirable for the apex angle θ of the insulator resist 38 to be as steep as possible; this is typically accomplished by placing the first turn 120 of the write coil 20b in close proximity to the "throat" (the narrow gap length region 60 in the recording gap 22), thus limiting shrinkage of the resist 38. However, this practice proves unworkable when the pole material (laminated NiFe/Fe) must be ion milled. The ion mill end point is on the resist which must be thick enough over all areas to allow for up to 15% over-etch without damage to underlying circuitry; close placement of the first coil 221 does not provide for the overetch resulting in coil damage and lowered yields. By placing a dummy coil in this position, however, the apex angle may be optimized and overetch damage of the first coil is avoided. The dummy coil is created simply by mechanically terminating coils 120, 220 so that they are not part of the coil circuit made up of the coils 20a, 20b, as shown in FIG. 3. The inclusion of the dummy coil turn 120, 220 in the write element significantly widens the process window for the write element pole definition ion mill process. This results in greater design flexibility and improves process yields.

The write element 52 with the NiFe/Fe laminate will produce an extraneous flux at the top of the P2 layer 16 away from the write gap 22 due to the high $4\pi M_s$ characteristic of the material. To limit this effect, a 1 μm layer of lower $4\pi M_s$ material such as (NiFe) N, or other material, is added to the 3.5 μm laminate 14. The NiFe will reduce any saturation of the P2 layer 16. The addition of a lower $4\pi M_s$ material to the P2 pole layer helps limit extraneous writing from the edge of the write elements.

To reduce the resistance of the read/servo element (SFB/(Cr/CoPtCr) 54, a high conductivity layer 62, such as Rh, (see FIG. 4) is placed below a Cr layer 64, in turn placed below the HFB layer 25, comprising CoPtCr. Placement above would result in prohibitive rates of shorting between read element 54 and S2 shield 30. This high conductivity layer 62 will show at the air bearing surface, requiring it to be both wear- and corrosion-resistant. Al, Cu, or Pt may be used to lower resistance; however, all are soft metals and/or are not corrosion-resistant. Rhodium is one of the harder, low resistance metals and provides corrosion-resistance. Generally, resistance of the read element 54 is reduced by 50%. Placement of the more conductive underlayer 62! (FIG. 4) under the magneto-resistive layer 24 for reduction in the resistance of the magneto-resistive element 54 gives greater flexibility in designing the element layout lead structure.

Exemplary Fabrication Process of Read/Write Head

The following is step-by-step description of fabrication for the tape head 10 disclosed above. This device may be constructed on magnetic or non-magnetic substrates 12, such as NiZn ferrite or RX70 (nominally, $Al_2O_3$—TiC), respectively. Use of RX70 requires the deposition of an alumina spacer between the substrate and a deposited and patterned S1 read shield. In this description, the NiZn ferrite structure will be outlined.

Sputter-deposit I1 read gap alumina 26 of 2,000 Å on the cleaned ferrite substrate 12;

Pattern alignment targets via sputter chrome liftoff;

Pattern chevron grating structure, ion mill to 450 Å depth, strip resist;

Sputter-deposit Soft Film Bias (SFB) 24 consisting of NiFeRh/Ta/NiFe;

Pattern and sputter-etch kerf region, strip resist;

Pattern Hard Film Bias (HFB) windows with liftoff resist, sputter etch, sputter deposit HFB material 25 (FIG. 4) consisting of Rh/Cr/CoPtCr, lifloff pattern;

Pattern and sputter-etch MR element 54 (MR element is defined as SFB+HFB; see FIGS. 4, 5) and S2 shield ground resistor 56 (FIG. 5), strip resist;

Pattern read legs 58a, 58b (FIG. 5) in liftoff resist, evaporate Ti/Au/Ti at 150/2,000/50 Å, liftoff. Contact S2 resistor 56 to read leg 58b made at this level (FIG. 5);

Sputter-deposit I2 gap alumina 28 at 2,200 Å;

Pattern and wet etch S2 shield 30 to resistor via 66 (see FIG. 6), strip resist;

Sputter-deposit 1 μm S2 read shield 30. Shield material consists of (NiFe/Fe) nitride laminations;

Pattern and ion mill to 60% end point the S2 shield pattern, etch to completion with ferric chloride, strip resist;

Sputter-deposit 2 μm I3 spacer alumina 32;

Sputter-deposit 1 μm wear/grounding shield 34, consisting of (NiFe/Fe) nitride laminations pattern wear shield and ion mill, strip resist;

Sputter-deposit 2 μm I4 spacer alumina 36;

Sputter-deposit 3.5 μm write element P1 pole piece 14, consisting of (NiFe/Fe) nitride laminations;

Pattern and ion mill P1 pole piece 14, strip resist;

Sputter-deposit 1.9 μm write gap alumina 18 (I5),

Sputter-deposit 2,000 Å chrome via etch mask material. Pattern read leg via (not shown), write back gap and wear/ground shield, sputter etch chrome, wet etch alumina to via end point, strip resist;

Pattern via protect regions, sputter etch chrome, strip resist;

Pattern first write coil 20a, including dummy coil 120 in first position, evaporate Ti/Au at 0.05/3.5 μm, liftoff. Additional gold is added to the read leg bond pads (not shown) at this step to provide bond pad planarity.

Pattern first crosslink bake insulator resist 38a and bake;

Pattern second write coil 20b, including dummy coil 220 in first position, evaporate Ti/Au at 0.05/3.5 μm, liftoff Additional gold is added to the read leg bond pads (not shown) at this step to provide bond pad planarity;

Pattern second crosslink bake insulator resist 38b and bake. This step sets the write throat height 60 (FIG. 2) and the apex angle θ;

Sputter-deposit the 3.5 μm write P2 pole piece 16, consisting of (NiFe/Fe) N laminations with an additional 1 to 2 μm layer of (NiFe) nitride.

Pattern and ion mill the P2 pole piece 16. Strip resist;

Pattern and wet etch the pad region (not shown) to remove P2 material;

Overcoat the structure with alumina 42 of sufficient height to allow planar lap back of the structure;

Mechanically lap the overcoated structure to a planar surface;

Deposit chrome at 2,000 Å as a via etch mask material; and

Pattern via and sputter etch chrome, wet etch alumina to expose bond pads.

Novel Features of the Present Invention

"Piggyback" read/write tape head which will allow same module read/servo/write functions simultaneously;

Placement of a rhodium (high conductivity, low wear/corrosion) layer under the HFB CoPtCr/Cr to reduce resistance and improve reliability;

Wear shield placement in the read write spacing layers to limit gap wear;

Grounded wear shield to ground static charge from the media and isolate the read/write functions of the head, also provides for same gap servo function;

Inclusion of the dummy coil turn to widen ion mill process window, improve yields and allow wider application of the process design; and Shield and pole piece material consisting of (NiFe/Fe) N laminates topped with a 1 to 2 μm (NiFe) N film to stop residual writing by creating a larger P2 pole.

INDUSTRIAL APPLICABILITY

The improved piggyback MR read/write tape head is expected to find use in magnetic recording.

Thus, there has been disclosed an improved piggyback MR read/write tape head. It will be readily apparent to those skilled in this art that various changes and modifications may be made, and all such changes and modifications are intended to fall within the scope of the invention, as defined by the appended claims.

What is claimed is:

1. A magneto-resistive read/write tape head for reading and writing to tape media along a tape head face and comprising a plurality of modules, each module comprising a read element and a write element spaced apart and terminating at said tape head face and formed over a substrate, said read element comprising a soft film bias layer and a hard film bias layer butting each side of the soft film bias layer and said write element comprising two pole tips spaced apart by a gap, said tape head further including a plurality of activating conducting coil turns operatively associated with said write element and covered by a cross-linked photoresist and positioned between said gap and one of said pole tips and set back from said tape head face, said tape head having the following elements:

(a) a wear shield between said read element and said write element for limiting wear of said gap between said two pole tips, said wear shield being grounded for decoupling read and write functions of said tape head, for allowing same module read servo/write functions simultaneously, and for grounding static charge from said tape media; and (b) a non-activating dummy coil turn closer to said pole tips than said activating coil turns for defining a forward termination of said cross-linked photoresist between said activating coil turns and said tape head face to thereby provide improved ease of processability.

2. The tape head of claim 1 wherein said wear shield and said two pole tips comprise (NiFe/Fe) nitride laminates topped with a 1 to 2 μm NiFe film to prevent residual writing.

3. The tape head of claim 1 wherein said wear shield comprises an electrically conductive material.

4. The tape head of claim 3 wherein said wear shield is grounded with a resistor comprising a magneto-resistive material connected to an output leg of said read element.

5. The tape head of claim 1 wherein said layer of electrically conductive and corrosion-resistant material consists essentially of rhodium.

6. The tape head of claim 1 wherein said soft film bias material consists essentially of a layer of NiFeRh, a layer of tantalum, and a layer of NiFe.

7. The tape head of claim 6 wherein said layer of NiFeRh is approximately 270 Å thick, said layer of tantalum is approximately 200 Å thick, and said layer of NiFe is approximately 350 Å thick.

8. The tape head of claim 1 wherein said hard film bias material consists essentially of CoPtCr.

9. The tape head of claim 8 wherein said layer of CoPtCr is approximately 1,000 Å thick.

10. The tape head of claim 8 wherein said layer of CoPtCr is supported on a layer of chromium, which in turn is supported on said layer of electrically conductive and corrosion-resistant material.

11. The tape head of claim 1 wherein said non-activating dummy coil turn comprises a coil turn that terminates back from said pole tips and is electrically disconnected from said activating coil turns.

12. The tape head of claim 1 further including a layer of electrically conductive and corrosion-resistant material supporting said hard film bias layer to reduce its resistance.

13. A magneto-resistive read/write tape head for reading and writing to tape media along a tape head face and comprising a plurality of modules, each module comprising a read element and a write element spaced apart and terminating at said tape head face and formed over a substrate, said read element comprising a soft film bias layer and a hard film bias layer butting each side of the soft film bias layer, said hard film bias material consisting essentially of CoPtCr and supported on a layer of chromium, and said write element comprising two pole tips spaced apart by a gap, said tape head further including a plurality of activating conducting coil turns operatively associated with said write element and covered by a cross-linked photoresist and positioned between said gap and one of said pole tips and set back from said tape head face, said tape head having the following elements:

(a) a wear shield between said read element and said write element for limiting wear of said gap between said two pole tips, said wear shield being grounded for decoupling read and write functions of said tape head, for allowing same module read/servo/write functions simultaneously, and for grounding static charge from said tape media;

(b) a layer of electrically conductive and corrosion-resistant, material supporting said hard film bias layer, beneath said layer of chromium, to reduce resistance of said hard film bias layer; and (c) a non-activating dummy coil turn closer to said pole tips than said activating coil turns for defining a forward termination of said cross-linked photoresist between said activating coil turns and said tape head face to thereby provide improved ease of processability.

14. The tape head of claim 13 wherein said wear shield and said two pole tips comprise (NiFe/Fe) nitride laminates topped with a 1 to 2 μm NiFe film to prevent residual writing.

15. The tape head of claim 13 wherein said wear shield comprises an electrically conductive material.

16. The tape head of claim 15 wherein said wear shield is grounded with a resistor comprising a magneto-resistive material connected to an output leg of said read element.

17. The tape head of claim 13 wherein said layer of electrically conductive and corrosion-resistant material consists essentially of rhodium.

18. The tape head of claim 13 wherein said soft film bias material consists essentially of a layer of NiFeRh, a layer of tantalum, and a layer of NiFe.

19. The tape head of claim 18 wherein said layer of NiFeRh is approximately 270 Å thick, said layer of tantalum is approximately 200 Å thick, and said layer of NiFe is approximately 350 Å thick.

20. The tape head of claim 13 wherein said layer of CoPtCr is approximately 1,000 Å thick.

21. The tape head of claim 13 wherein said non-activating dummy coil turn comprises a coil turn that terminates back from said pole tips and is electrically disconnected from said activating coil turns.

* * * * *